Sept. 19, 1933.   J. D. WYDA   1,927,729
TIRE AND RIM
Filed June 15, 1932
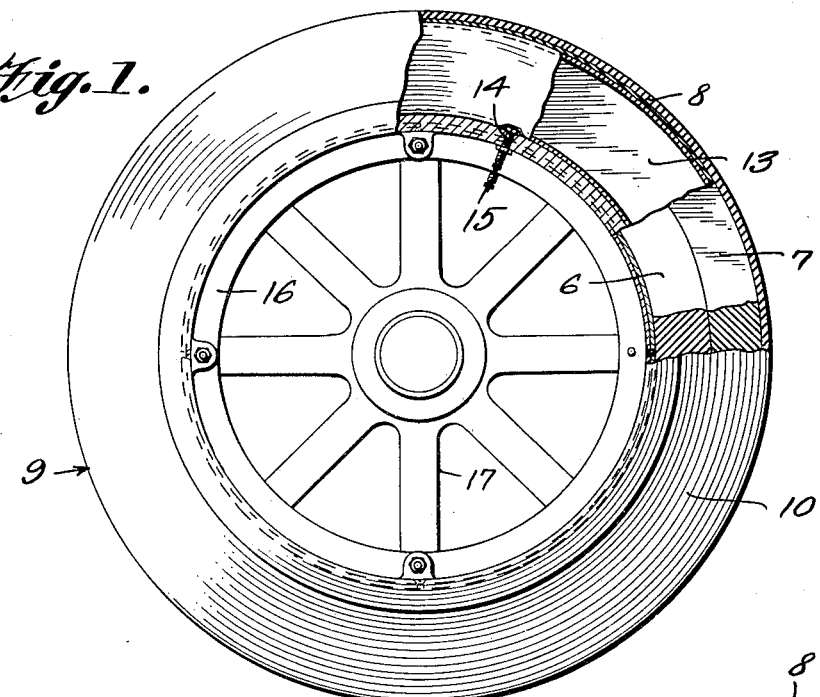
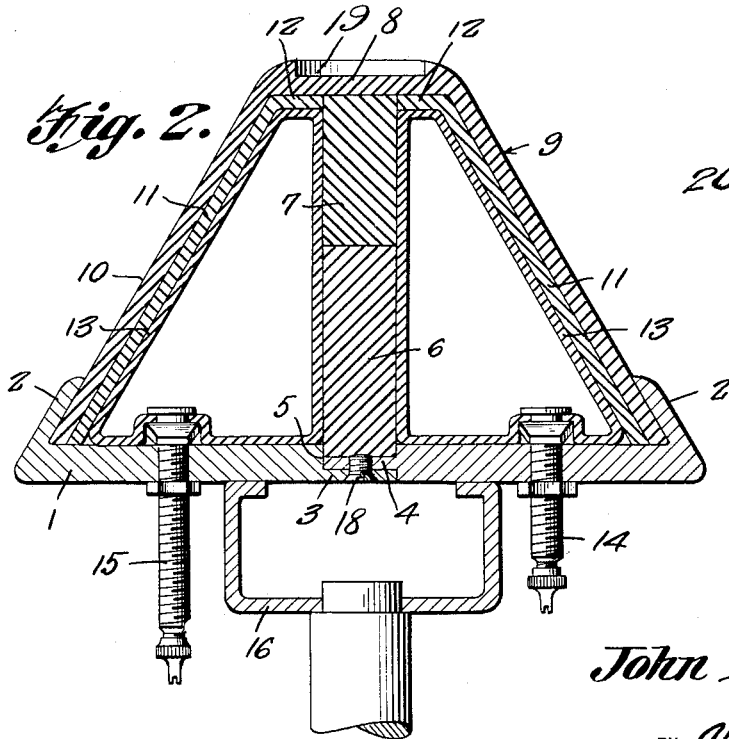
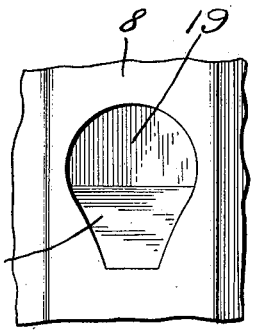
John D. Wyda,
INVENTOR
BY Victor J. Evans & Co.
ATTORNEY Patented Sept. 19, 1933

1,927,729

UNITED STATES PATENT OFFICE 1,927,729

TIRE AND RIM

John D. Wyda, Glen Lyon, Pa.

Application June 15, 1932. Serial No. 617,410

1 Claim. (Cl. 152—22)

My present invention has reference to a tread for vehicle wheels and among the objects of the invention is the provision of a tread of a different shape and design from that ordinarily employed and of a construction to insure easy riding, better rounding of curves and easier steering of the wheel; one which will avoid accidents caused by a puncture or blowout, one which can run on a completely flat tire without injury to the walls of the tire casing, one which is of a stream-line construction to cut down wind resistance; one in which the parts constituting the same can be readily disassociated for replacement and as readily assembled and also one which may be readily attached to a wheel carrying a felly or which will afford a rim as well as a cushion tread for a wire spoke wheel.

To the attainment of the foregoing the invention consists in the improvement hereinafter described and definitely claimed.

In the drawing:

Figure 1 is a side elevation of a wheel equipped with the improvement, parts of the latter being broken away and being in section and the said sections being stepped or beyond the same plane with each other.

Figure 2 is an enlarged transverse sectional view through the improvement.

Figure 3 is a fragmentary plan view of the tread of the casing.

In carrying out my invention I employ a metal rim 1. The rim has its outer edges provided with inwardly directed beads 2. The rim is made up of two sections and the confronting ends of one of the sections is notched from its outer periphery to afford a reduced portion 3, while the end of the second and cooperating section is provided with a central tongue 4 overlying the reduced portion 3, and the part 3 is bolted to the tongue 4 at desired intervals. The tongue being arranged below the outer periphery of the rim affords the latter with a central circumferential pocket.

In the showing of the drawing the rim 1 is secured to the felly of a wooden spoke wheel but obviously the sectional rim can have attached thereto the spokes of a wire wheel. In the circumferential pocket 5 in the outer periphery of the rim 1 there is seated and there may be secured the inner end of a hard rubber ring 6. The ring has its opposite faces flat and parallel and the same is sufficiently large to project a considerable distance beyond the felly 1. The ring is of hard rubber and has either resting or secured upon its outer periphery another ring 7 which is of soft rubber. Both the rings 6 and 7 provide a partition.

Designed to rest upon the periphery of the outer yieldable section 7 of the ring 6 there is the flattened and thickened end or tread 8 of a pneumatic tire casing 9. The side walls 10 of the casing are arranged at opposite angles so that the casing is substantially V-shaped in cross section. The lower edges of the side walls of the casing are designed to grippingly engage with the inner faces of the beads 2 of the rim. On the inner face of the casing 9 and in contact with the tread surface there is a reinforcing liner 11, which may be of fabric and which has its outer and straight ends 12 in contact with the opposite sides of the ring section 7.

Designed to be received in the compartments afforded between the casing, liners and ring partitions there are pneumatic tubes 13. The tubes are of substantially triangular shape in cross section and the respective tubes have attached thereto the threaded air inlet valve casings 14 and 15 which are of the usual type and which carry the usual inside valves. The casing 15 is of a greater length than the casing 14 as the said casing 15 is designed to be arranged next to the body of the vehicle so that the same will project beyond the felly 16 of the wheel 17 to permit of an air pump being readily attached to the valve in the casing 15. Both of the casings are inflated to a desired degree. Because of the cross sectional V-shaped formation of the casing 9 small wind resistance will be offered thereby. The thick tread 8 of the casing insures the device obtaining a firm traction grip with the road surface and as this tread is comparatively narrow, the wheel equipped with the improvement will readily round curves and the said wheel can be steered in an easier manner than tires of the ordinary construction. In case of one of the inner tubes or cells 13 being punctured the other tube will uphold the tire to permit of the travel of the vehicle for an indefinite period of time and should both of the tubes become punctured, the tread 8 and the ring partitions 6 and 7 will uphold the vehicle without allowing the collapsing of the tread, for at least a period of time that will permit a driver reaching a garage for repairs. The sections of the rim 1 are held together by only short bolts 18 which are readily removable, so that the elements comprising the entire device may be readily separated and as easily reassembled should occasion require.

To positively prevent the skidding of the tire the thread 8 of the casing 9 is provided, at determined spaced intervals throughout its circumference with substantially pear-shaped depressions or pockets 19. As best disclosed by Figure 3 of the drawing the rear and rounded wall of each of the pockets is comparatively deep, while the bottom wall 20 afforded at the restricted sides of the depression gradually inclines toward the said deepened wall. This will prevent dirt or the like filling the pockets as the dirt in the portion 19 will have a tendency to be forced by contact out through the passage 20 and likewise dirt that enters the passage 20 will have a tendency to cause the same to accumulate and thereafter be projected through the part 19. These depressions or pockets are in the nature of vacuum grips and insure the quick stopping as well as the anti-skidding of the device.

Having described the invention, I claim:

A pneumatic tire comprising an outer casing including a comparatively narrow tread and side walls integral therewith and diverging from the tread, a solid annular cushioning member engaging the inner face of the tread and spaced from the side walls, a semi-rigid annular member engaging the cushioning member and adapted to rest on a rim, said members, tread and side walls cooperating in forming spaces of substantially triangular shape to receive correspondingly shaped inflating tubes, and linings engaging the side walls and the tread and abutting and cushioning member.

JOHN D. WYDA.